(12) United States Patent
Chalin (10) Patent No.: US 7,347,435 B2
(45) Date of Patent: Mar. 25, 2008

(54) SUSPENSION SYSTEM HAVING REDUCED WEIGHT ARM CONSTRUCTION

(75) Inventor: Thomas N. Chalin, Fairview, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 359 days.

(21) Appl. No.: 11/036,458

(22) Filed: Jan. 14, 2005

(65) Prior Publication Data

US 2006/0157950 A1 Jul. 20, 2006

(51) Int. Cl.
*B60G 9/00* (2006.01)

(52) U.S. Cl. .................. 280/124.116; 280/124.11; 29/897.2

(58) Field of Classification Search ............ 280/124.1, 280/124.11, 124.111, 124.112, 124.153, 124.157, 280/124.128, 124.116; 29/897, 897.2
See application file for complete search history.

(56) References Cited

U.S. PATENT DOCUMENTS

| | | | |
|---|---|---|---|
| 2,641,482 A * | 6/1953 | Wilfert | ............... 280/124.116 |
| 2,913,252 A | 11/1959 | Norrie | |
| 4,166,640 A | 9/1979 | VanDenberg | |
| RE30,308 E | 6/1980 | Masser | |
| 4,615,539 A | 10/1986 | Pierce | |
| 4,693,486 A | 9/1987 | Pierce et al. | |
| 5,037,126 A | 8/1991 | Gottschalk et al. | |
| 5,116,075 A | 5/1992 | Pierce et al. | |
| 5,366,237 A | 11/1994 | Dilling et al. | |
| 5,375,871 A | 12/1994 | Mitchell et al. | |
| 5,476,251 A | 12/1995 | Moses | |
| 5,634,655 A | 6/1997 | Chalin | |
| 5,690,353 A | 11/1997 | VanDenberg | |
| 5,845,919 A | 12/1998 | VanDenberg | |
| 5,954,351 A | 9/1999 | Koschinat | |
| 6,039,336 A | 3/2000 | Frey | |
| 6,209,895 B1 | 4/2001 | Mueller et al. | |
| 6,241,266 B1 | 6/2001 | Smith et al. | |
| 6,491,314 B2 | 12/2002 | Smith et al. | |
| 6,508,393 B2 | 1/2003 | Chalin | |
| 6,557,875 B2 | 5/2003 | Schlosser | |
| 6,641,156 B1 | 11/2003 | Barlas et al. | |
| 6,733,020 B2 | 5/2004 | Reineck | |
| 2001/0013676 A1 | 8/2001 | Reast | |
| 2001/0020775 A1 | 9/2001 | Pierce et al. | |
| 2003/0067134 A1 | 4/2003 | Galazin | |
| 2003/0146592 A1 | 8/2003 | Chalin et al. | |
| 2004/0080132 A1 | 4/2004 | Chan et al. | |
| 2004/0100060 A1 | 5/2004 | Reast | |

FOREIGN PATENT DOCUMENTS

| | | |
|---|---|---|
| EP | 0240649 | 10/1987 |
| EP | 0863060 | 9/1998 |

OTHER PUBLICATIONS

Detroit Steel Products advertisement of "Spraxle", undated.
Spur Industries Inc. web page, dated 2004.

* cited by examiner

*Primary Examiner*—Paul N. Dickson
*Assistant Examiner*—Tiffany L. Webb
(74) *Attorney, Agent, or Firm*—Smith IP Services, P.C.

(57) ABSTRACT

A suspension system having a reduced weight arm construction. In one vehicle suspension system, an axle is constructed at least partially of a metal alloy. An arm assembly of the suspension system includes an axle attachment constructed at least partially of a material which cannot be welded directly to the metal alloy. To interconnect the axle to the axle attachment of the arm assembly, a transition device is permanently secured to the metal alloy and permanently secured to the axle attachment material.

21 Claims, 6 Drawing Sheets

SUSPENSION SYSTEM HAVING REDUCED WEIGHT ARM CONSTRUCTION

BACKGROUND

The present invention relates generally to vehicle suspension systems and, in an embodiment described herein, more particularly provides a suspension system having a reduced weight arm construction.

In the art of suspension systems used in trucks designed for transporting payloads from one location to another it is increasingly important to reduce the tare weight of the suspension systems. In this manner, the payload transported by the truck can be increased, or the gross weight of the truck and payload may be reduced, thereby providing for increased efficiency and economy in the trucking operation.

One possible option for reducing the weight of a suspension system is to make components of the suspension system out of lighter materials, such as composites, aluminum, titanium, etc. Unfortunately, such lighter materials may be inappropriate for some components (such as an axle, etc.) which are subjected to large stresses in operation, or it may be appropriate to make one component out of one material and another component out of another material where the components must later be permanently secured to each other.

If, as in the past, these components were made of steel, then it is a fairly straightforward matter of welding the components to each other. However, if one component is made of aluminum and the other component is made of steel, then the components cannot be welded directly to each other. Other dissimilar metal alloys likewise cannot be welded directly to each other.

Therefore, it may be seen that improved methods of constructing reduced weight suspension systems are needed. It is one of the objects of the present invention to provide such improvements in reduced weight suspension systems.

SUMMARY

In carrying out the principles of the present invention, a suspension system is provided which solves at least one problem in the art. One example is described below in which an arm of the suspension system is made of a reduced weight material, such as aluminum. An axle of the suspension system may be made of steel. A novel method is provided for attaching the arm to the axle.

In one aspect of the invention, a vehicle suspension system is provided which includes an axle constructed at least partially of a first metal alloy. An arm assembly includes an axle attachment constructed at least partially of a second metal alloy which cannot be welded directly to the first metal alloy. A transition device is permanently secured to the first metal alloy and is permanently secured to the second metal alloy. The transition device thereby interconnects the axle to the axle attachment of the arm assembly.

In another aspect of the invention, a vehicle suspension system may include an axle constructed at least partially of a metal alloy which may or may not be a steel alloy. An arm assembly includes an axle attachment constructed at least partially of a material which cannot be welded directly to the metal alloy. The axle attachment material may or may not be an aluminum alloy or another metal alloy. A transition device permanently secures the metal alloy to the axle attachment material to interconnect the axle to the axle attachment.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
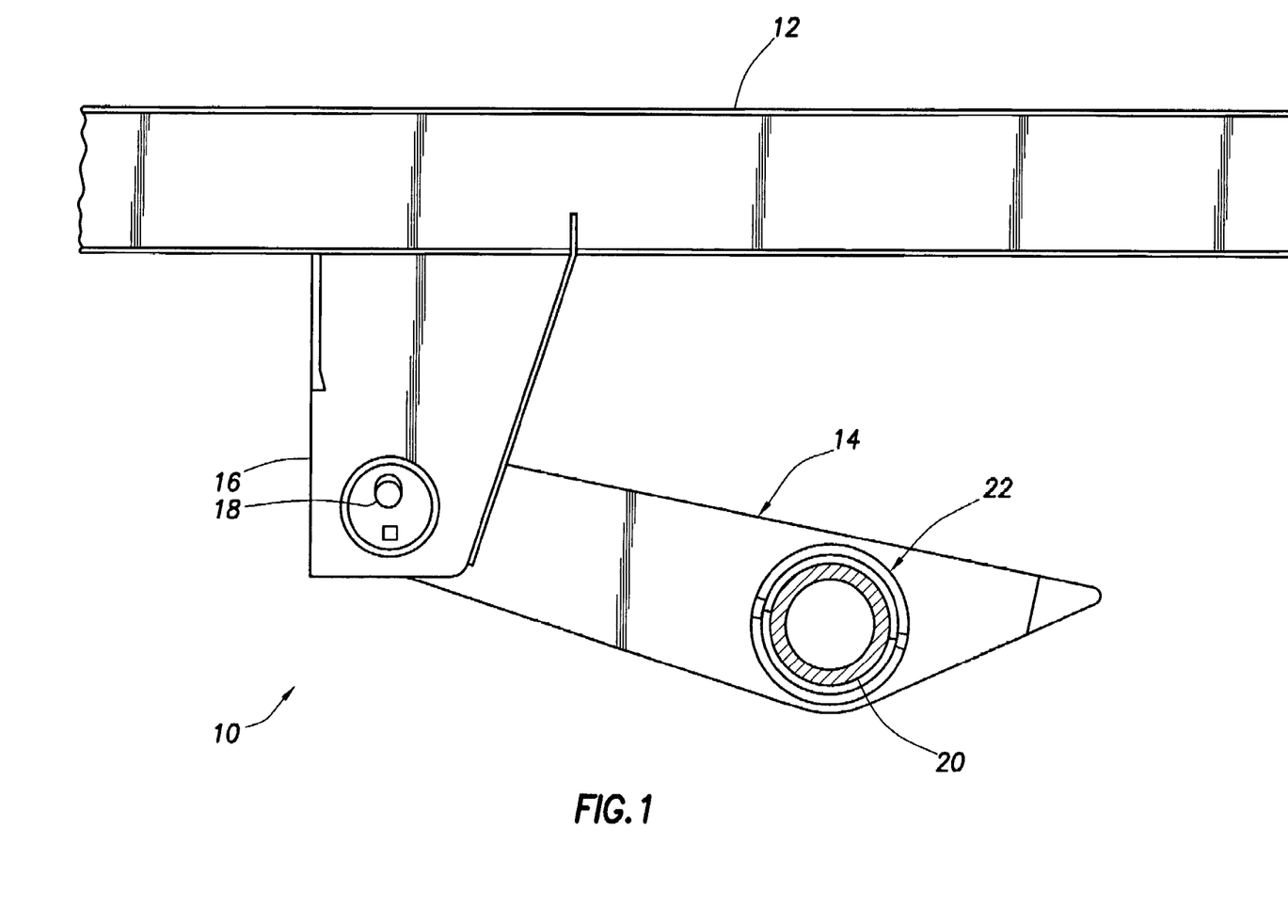
FIG. 1 is a side elevational view of a suspension system embodying principles of the present invention.

Representatively illustrated in FIG. 1 is a suspension system 10 which embodies principles of the present invention. In the following description of the suspension system. 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

As depicted in FIG. 1, the suspension system 10 is of the trailing arm type and is attached to a frame rail 12 of a vehicle. It will be understood by those skilled in the art that the suspension system 10 is one of two such suspension systems located on opposite sides of the vehicle. Note that, although the suspension system 10 is representatively illustrated as a single trailing arm non-steerable suspension system, the invention is not limited to such suspension systems. Instead, the principles of the invention may be used in any other type of suspension system, such as parallelogram, modified parallelogram, spring beam, steerable, lift axle, leading arm, etc., suspension systems.

The suspension system 10 includes an arm assembly 14 pivotably connected to a hanger bracket 16 at a pivot connection 18. An axle 20 extends between the arm assemblies 14 located on opposite sides of the vehicle (see FIG. 6). In one unique feature of the suspension system, the axle 20 is secured to each arm assembly 14 using a transition device 22.

For example, the axle 20 could be constructed mainly of a steel alloy and the arm assembly 14 could be constructed mainly of an aluminum alloy. Of course, a steel alloy cannot be effectively welded to an aluminum alloy using common procedures such as electric resistance welding. To solve this problem, the transition device 22 may be uniquely constructed so that an inner section of the transition device can be welded to the axle 20 and an outer section of the transition device can be welded to the arm assembly 14, thereby permanently securing the axle to the arm assembly.

It should be clearly understood that it is not necessary for the arm assembly 14 to be constructed of aluminum alloy or for the axle 20 to be constructed of steel alloy. Other materials which cannot be effectively permanently secured directly to each other may be used. For example, the arm assembly 14 and/or axle 20 could be made of a material such as a titanium alloy, or a non-metal material. It is also not necessary for the transition device 22 to be welded to the axle 20 or to the arm assembly 14 since other methods, such as adhesive bonding, may be used to permanently secure the transition device to the axle and/or arm assembly.

Figure 2:
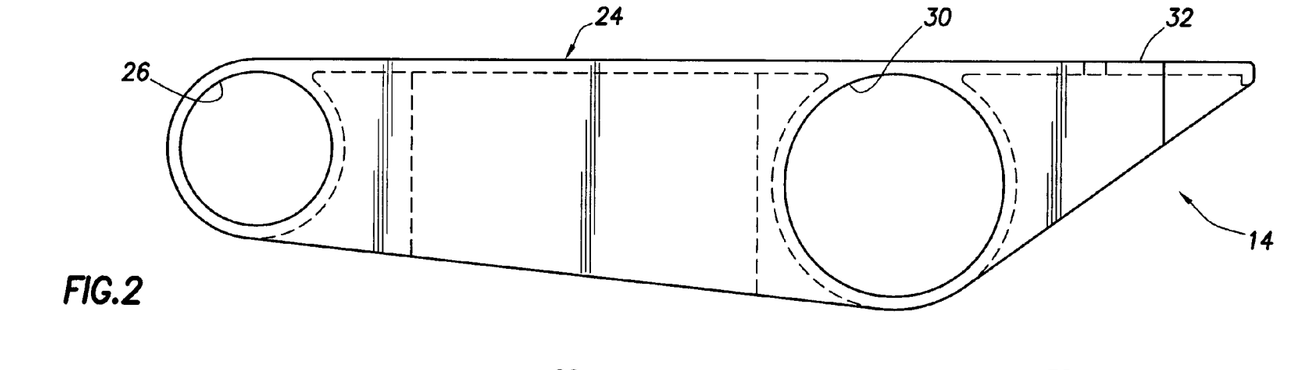
FIG. 2 is an enlarged scale side elevational view of an arm used in the suspension system of FIG. 1.

Referring additionally now to FIG. 2, an arm 24 of the arm assembly 14 is illustrated apart from the remainder of the suspension system 10. In this view, it may be seen that the arm 24 is preferably integrally constructed of a single piece of material. The arm 24 may, for example, be an aluminum casting. Alternatively, the arm 24 could be made of another metal alloy, such as a titanium alloy, or a non-metal material.

At a forward end of the arm 24, a bushing attachment 26 is formed as a laterally extending cylindrical opening. A bushing 28 (see FIG. 4) received in the attachment 26 opening is used in the pivot connection 18 to pivotably attach the arm assembly 14 to the hanger bracket 16.

Another laterally extending opening formed in the arm 24 is used as part of an axle attachment 30. Of course, the axle attachment 30 surrounding the opening is made of the same material as the rest of the arm 24 if the arm is integrally constructed of a single piece of material as described above. However, it is not necessary for the arm 24 to be integrally constructed, or for the axle attachment 30 to be made of a material similar to that of the rest of the arm.

The axle attachment 30 is depicted as surrounding the cylindrical opening, so that it is complementarily shaped relative to the transition device 22. However, other shapes of the axle attachment 30 may be used, for example, if the transition device 22 is otherwise shaped. The axle attachment 30 could include one or more recesses, one or more concave, convex or planar surfaces, or a combination of these, etc., rather than a fully enclosed opening. The axle attachment 30 may have any shape in keeping with the principles of the invention.

An air spring platform 32 is formed on the arm 24 somewhat rearward of the axle attachment 30. Note that the air spring platform 32 may be integrally formed with the rest of the arm 24, for example, if the arm is constructed of a single piece of material. An air spring (such as the air spring 34 depicted in FIG. 7) may be interconnected between the platform 32 and the frame rail 12 in the suspension system 10. Other components, such as shock absorbers, brake actuators, etc., may also be attached to the arm 24 as desired.

Figure 3:
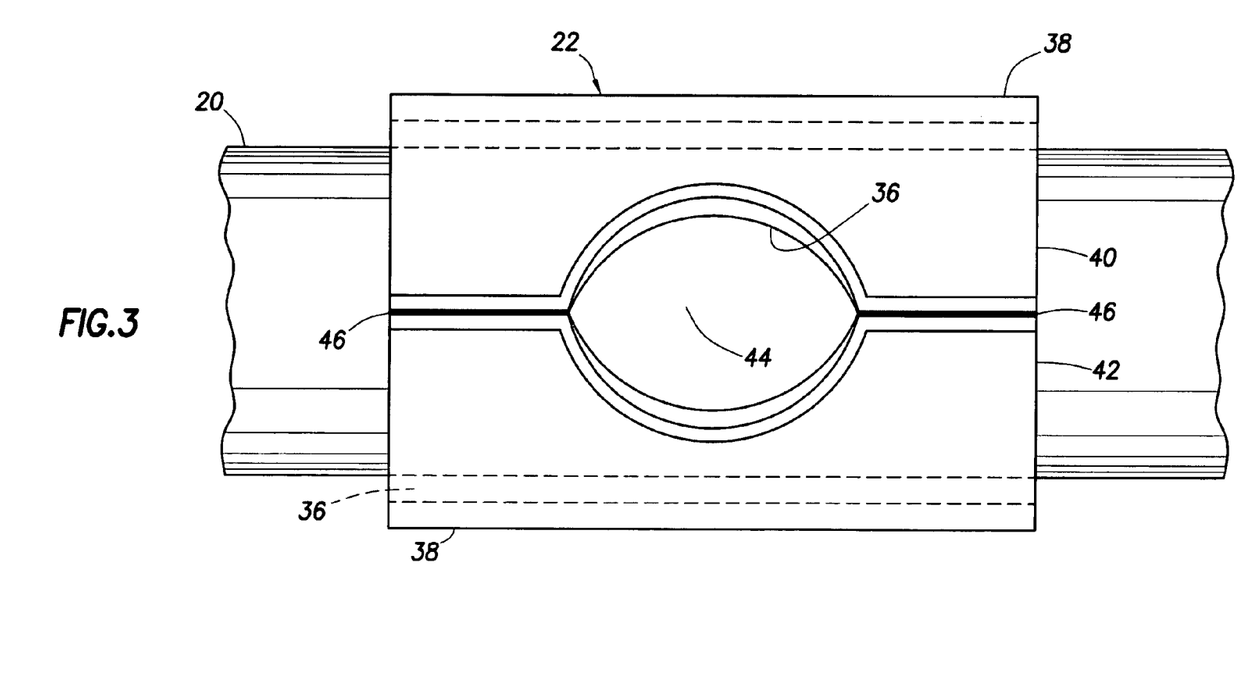
FIG. 3 is an enlarged scale elevational view of a transition device attached to an axle of the suspension system of FIG. 1.

Referring additionally now to FIG. 3, the manner in which the transition device 22 is permanently secured to the axle 20 is representatively illustrated. In this view it may be seen that the transition device 22 includes an inner section 36 and an outer section 38. The inner section 36 is constructed of a material which may be permanently secured to the axle 20, such as by welding, and the outer section is constructed of a material which may be permanently secured to the axle attachment 30 of the arm 24.

As depicted in FIG. 3, the sections 36, 38 are formed as part of two halves or pieces 40, 42 of the transition device 22. That is, the piece 40 has one portion of the inner section 36 in it, and the other piece 42 has the another portion of the inner section in it. Similarly, one portion of the outer section 38 is formed on the piece 40, and another portion of the outer section 38 is formed on the piece 42.

The pieces 40, 42 are semi-circular in cross-section, thereby forming a hollow cylindrical shell which can be positioned about the axle 20. Of course, if the axle 20 has a shape other than cylindrical, the transition device 22 may be shaped accordingly. For example, the axle 20 could have a square cross-section, in which case the pieces 40, 42 could form a hollow square-shaped cross-section shell.

Preferably, the pieces 40, 42 are compressed against an external surface of the axle 20 prior to welding the inner section 36 to the axle, so that voids between the transition device 22 and the axle are removed before welding, thus providing a better weld. For example, a clamp could be used to bias the pieces 40, 42 toward each other. Preferably, a tensile hoop stress remains in the transition device 22, and a compressive hoop stress remains in the axle 20 after the welding operation.

Note that it is not necessary for the transition device 22 to include multiple pieces 40, 42. The transition device 22 could be compressed against the axle 20 prior to welding even if the transition device is a single piece. For example, the transition device 22 could be a hollow cylinder which is press-fit onto the axle 20, or the transition device could be shrink-fit onto the axle, etc.

For the configuration of the transition device 22 depicted in FIG. 3, the section 36 is welded to the axle 20 about a periphery of an opening 44 formed between the pieces 40, 42. The pieces 40, 42 are welded to each other and to the axle 20 along a seam 46 between the pieces. That is, the inner section 36 of the piece 40 is welded to the inner section of the piece 42 and to the axle 20 along the seam 46 to either side of the opening 44.

Only one side of the transition device 22 is visible in FIG. 3, but it will be appreciated that the other side of the transition device has a similar opening 44 and seam 46 formed between the pieces 40, 42. Preferably, the openings 44 and seams 46 are closely aligned with a horizontal plane bisecting the axle 20 at a run height of the suspension system 10, so that the welds are located in relatively low stressed portions of the axle.

Figure 4:
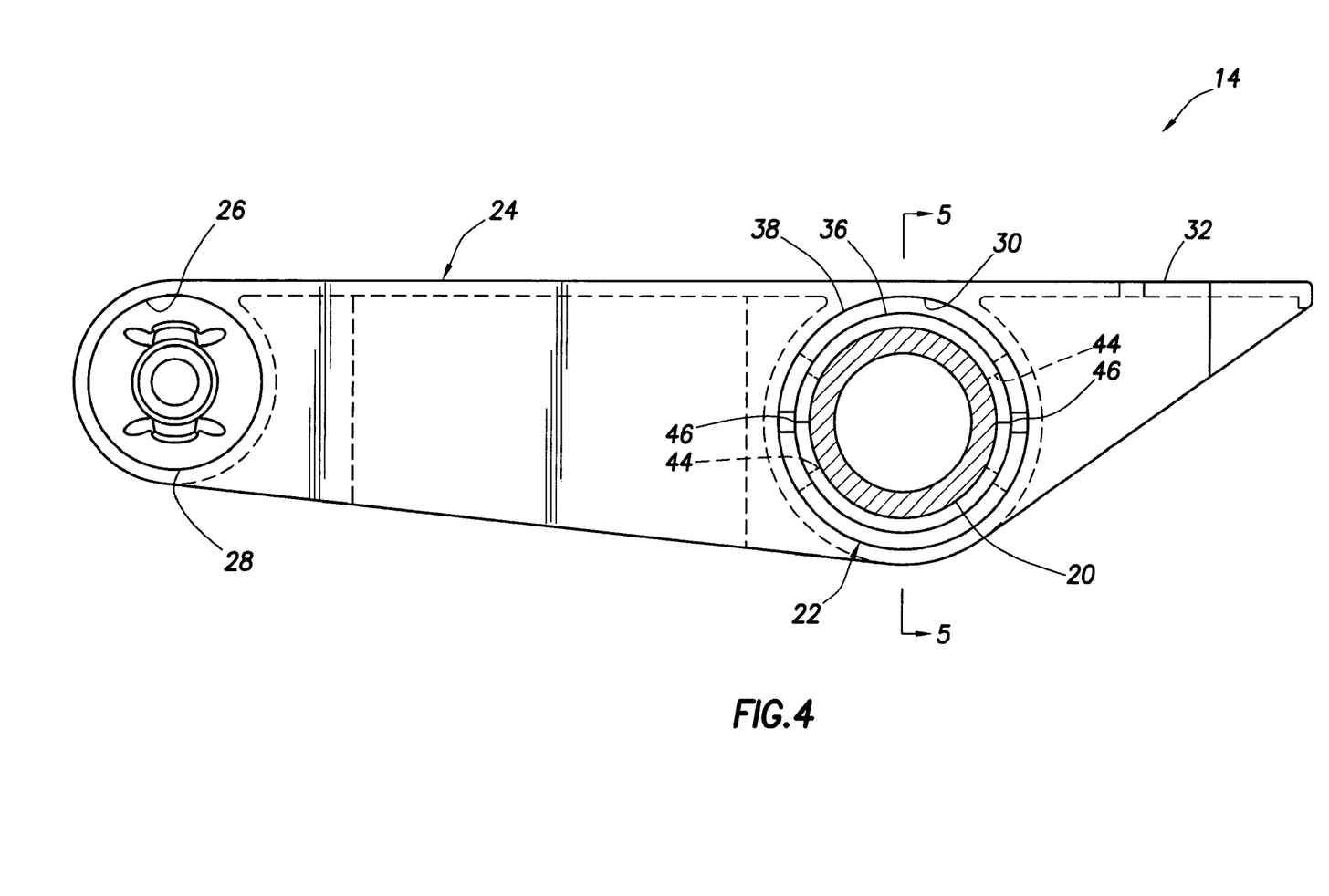
FIG. 4 is an enlarged scale side elevational view of an arm assembly connected to the axle using the transition device of FIG. 3.

Referring additionally now to FIG. 4, the arm assembly 14 is shown apart from the remainder of the suspension system 10, with the axle 20 and transition device 22 received in the axle attachment 30. The bushing 28 is also received in the bushing attachment 26.

The outer section 38 of the transition device 22 is permanently secured to the axle attachment 30, thereby permanently securing the axle 20 to the arm 24. Various methods may be used to secure the outer section 38 to the axle attachment 30. For example, the outer section 38 may be welded or adhesively bonded to the axle attachment 30. Preferably, the axle attachment 30 and the outer section 38 are each made of a light weight metal, such as an aluminum alloy, and electrical resistance welding is used to weld the outer section to the axle attachment.

Figure 5:
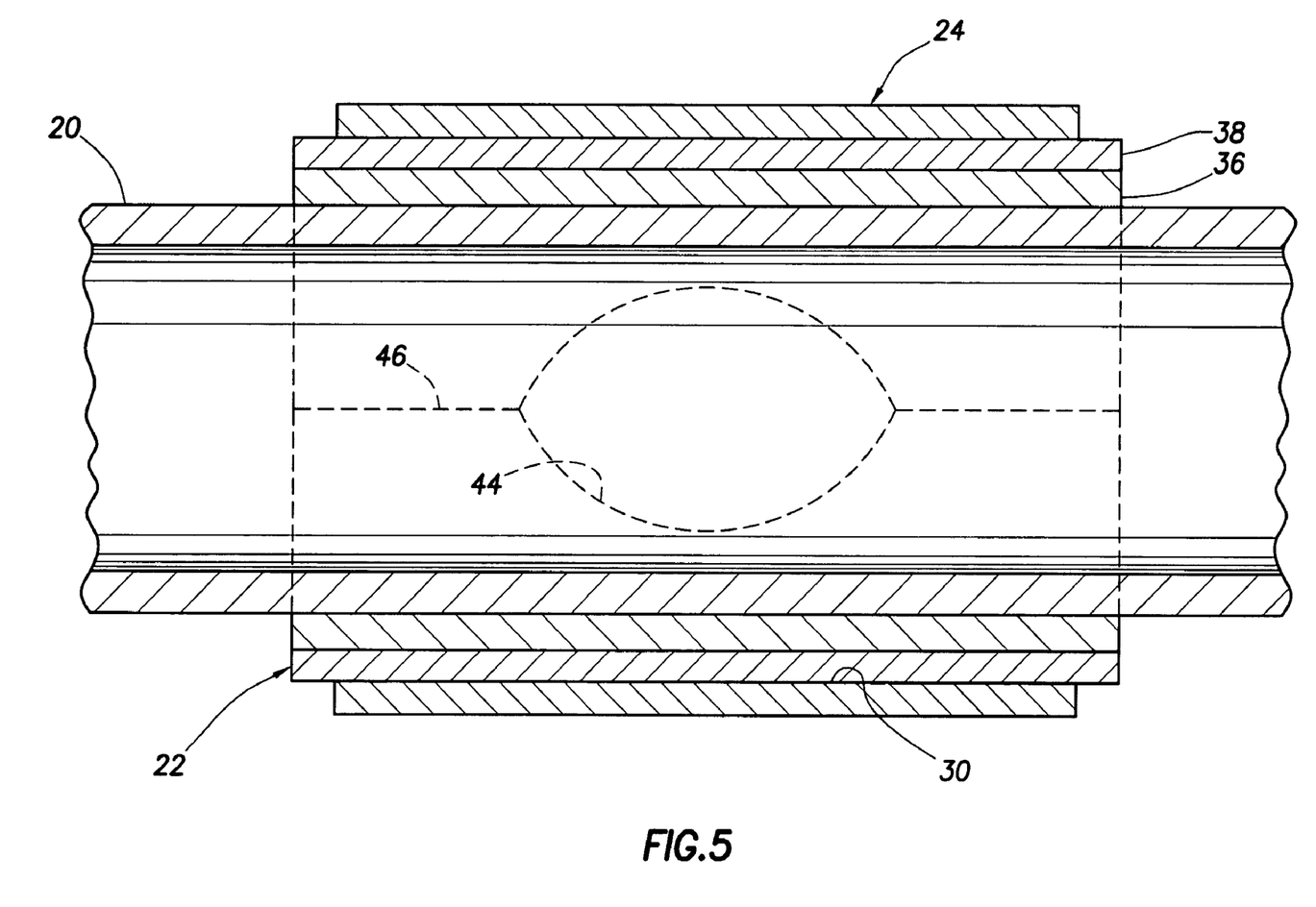
FIG. 5 is an enlarged scale cross-sectional view of the arm assembly, axle and transition device, taken along line 5-5 of FIG. 4.

A cross-sectional view of the arm assembly 24, axle 20 and transition device 22 is shown in FIG. 5. In this view it may be clearly seen that an inner side surface of the axle attachment 30 is secured to an outer side surface of the outer section 38 of the transition device 22, and an inner side surface of the inner section 36 is secured to an outer side surface of the axle 20. It will be readily appreciated that if the axle 20 is made of a steel alloy and the arm 24 (or at least the axle attachment 30) is made of an aluminum alloy, the transition device 22 provides a convenient means to use welding to permanently secure the axle to the arm.

Prior to welding the outer section 38 to the axle attachment 30, these components may be compressed against each other to remove any voids therebetween. Any of the methods described above for compressing the transition device 22 against the axle 20 (e.g., clamping, press-fitting, shrink-fitting, etc.) may also be used for removing voids between the transition device and the axle attachment 30. A tensile hoop stress may remain in the axle attachment 30, and a compressive hoop stress may remain in the outer section 38 after the welding operation.

As noted above, the outer section 38 of the transition device 22 may be made of a different material than that of the inner section 36. Either or both of the sections 36, 38 may be made of a metal alloy or non-metal material. Either or both of the sections 36, 38 may be a coating, cladding or deposition applied to the other. Preferably, the sections 36, 38 are permanently secured to each other prior to securing the transition device 22 to either the axle 20 or the axle attachment 30.

In the embodiment described herein, where the axle 20 is made of a steel alloy and the arm 24 is made of an aluminum alloy, it is preferred that the inner section 36 be made of a steel alloy and the outer section be made of an aluminum alloy. In this manner, a surface of the inner section 36 (e.g., along the seam 46 and about the opening 44) may be conveniently welded to an outer surface of the axle 20, and a surface of the outer section 38 may be conveniently welded to a surface of the axle attachment 30.

One manner of providing the transition device 22 having the inner section 36 made of a steel alloy and the outer section 38 made of an aluminum alloy is to bond these to each other. Various techniques, such as diffusion or metallurgical bonding, are available. For example, metallurgically bonded unweldable dissimilar metals are commercially available from Spur Industries, Inc. of Spokane, Wash.

Figure 6:
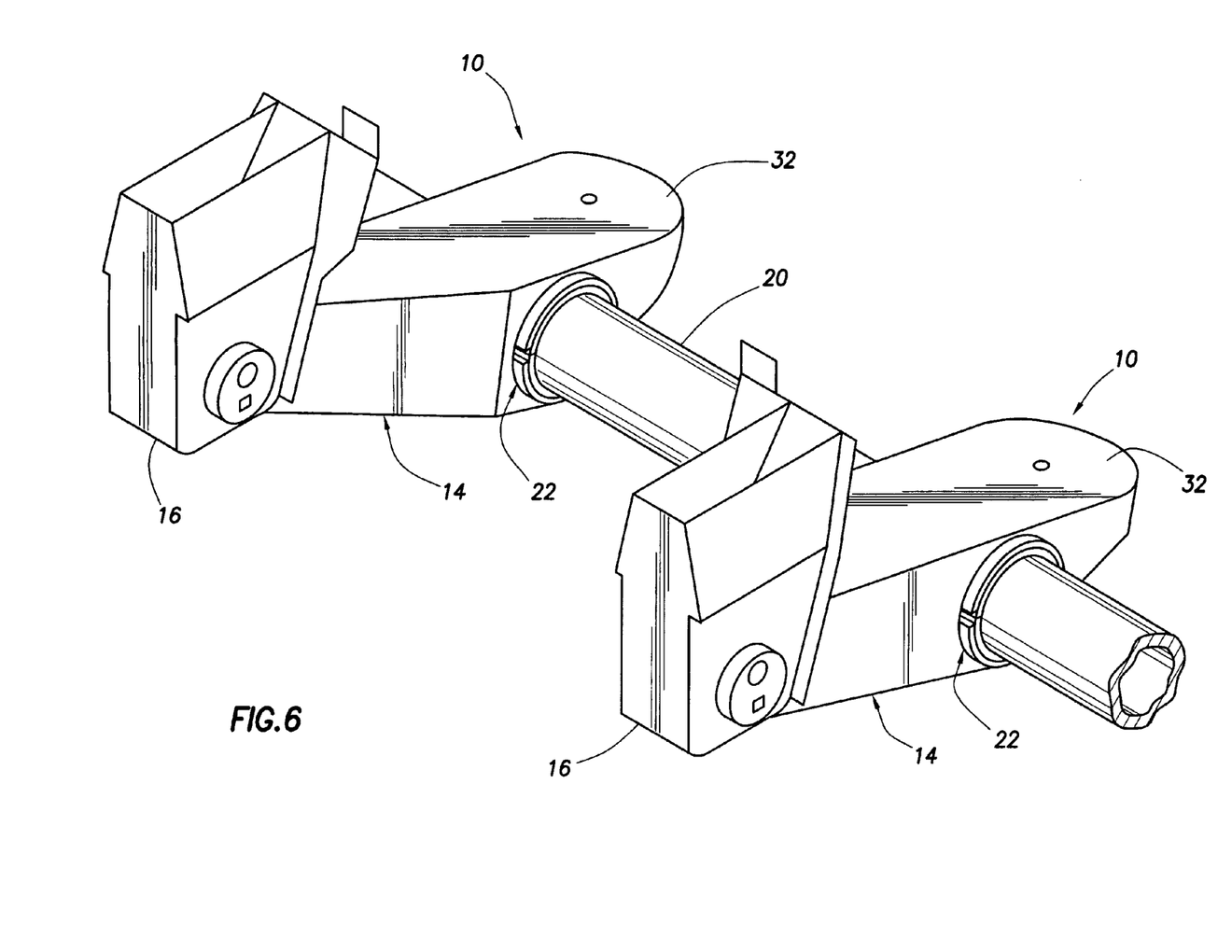
FIG. 6 is an isometric view of the suspension system of FIG. 1.

Referring additionally now to FIG. 6, two of the suspension systems 10 are depicted secured at either end of the axle 20. Each of the arm assemblies 14 is permanently secured to the axle 20 and pivotably connected to a respective one of the hanger brackets 16. It may now be fully appreciated how the invention permits light weight materials to be used in the construction of the suspension systems 10 to thereby conveniently, economically and efficiently provide reduced tare weight of a vehicle using the suspension systems.

Figure 7:
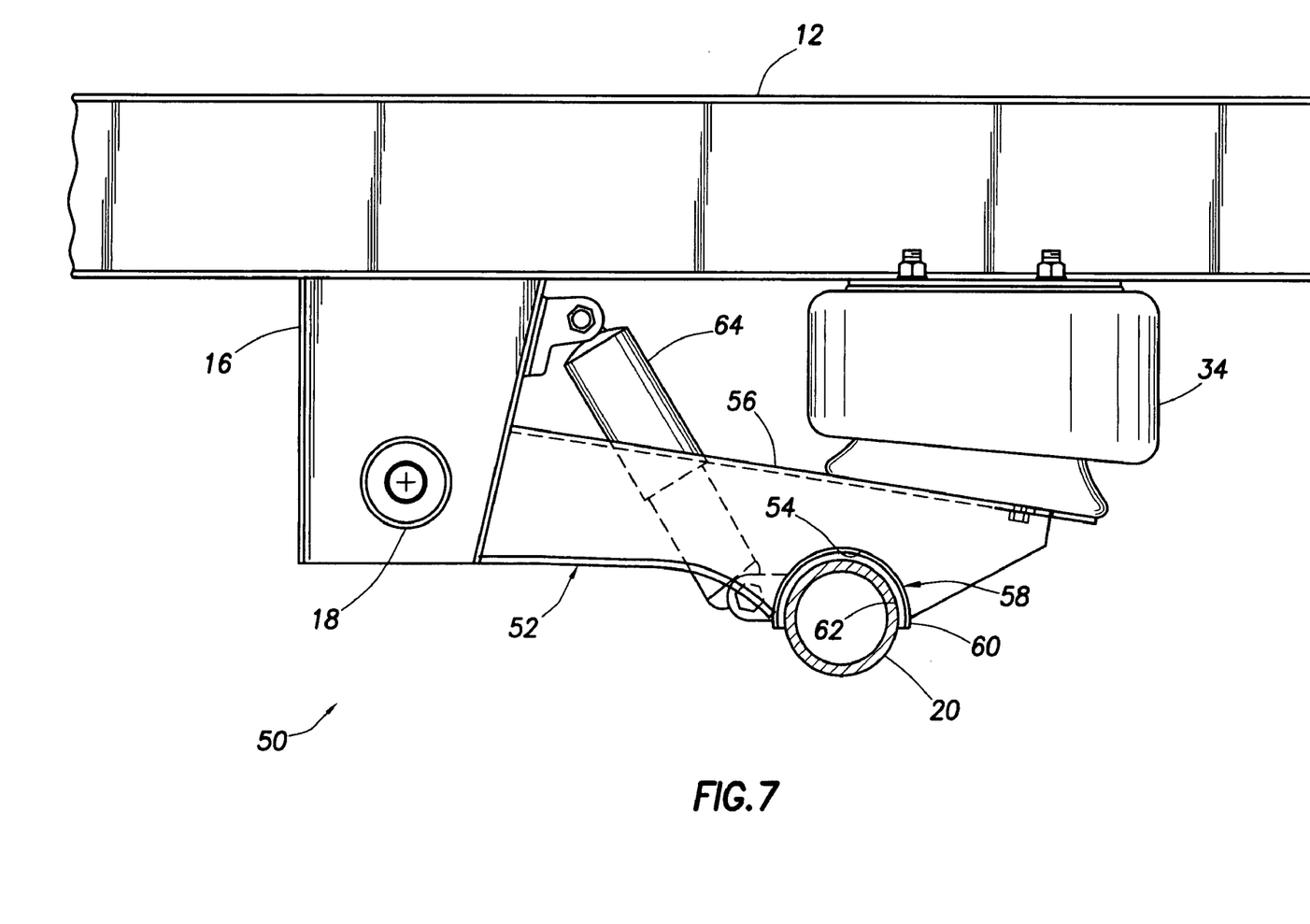
FIG. 7 is a side elevational view of another suspension system embodying principles of the present invention.

Referring additionally now to FIG. 7, another suspension system 50 is representatively illustrated. Several of the components of the suspension system 50 are similar to those described above for the suspension system 10, and so these components are indicated in FIG. 7 using the same reference numbers.

The suspension system 50 differs from the suspension system 10 in one respect in that it has a somewhat differently constructed arm assembly 52. The arm assembly 52 includes an axle attachment 54 which is shaped as a concave recess formed in an arm 56 of the assembly. Although the axle attachment 54 has a semi-circular or arc shape as depicted in FIG. 7, any shape or combination of shapes may be used for the axle attachment in keeping with the principles of the invention.

The suspension system 50 also has a shock absorber 64 interconnected between the hanger bracket 16 and the arm assembly 52. Various other components (e.g., brake actuators, etc.) may be included in the suspension system 50.

The suspension system 50 also differs from the suspension system 10 in another respect in that it has a transition device 58 which does not completely encircle the axle 20. In addition, the transition device 58 is made of a single piece, rather than multiple pieces. Note that the transition device 58 could completely encircle the axle 20 and could include multiple pieces if desired.

The transition device 58 includes an outer section 60 and an inner section 62. These may be similar to the respective outer section 38 and inner section 36 of the transition device 22. Preferably, the outer section 60 is made of a material which may be welded to the axle attachment 54, and the inner section 62 is made of a material which may be welded to the axle 20. For example, if the axle 20 is made of a steel alloy then the inner section 62 may also be made of a steel alloy, and if the axle attachment 54 is made of an aluminum alloy then the outer section 60 may also be made of an aluminum alloy. Other materials may be used for any of these components if desired.

The transition device 58 is preferably compressed against the axle 20 prior to welding the inner section 62 to the outer surface of the axle. Various techniques may be used, such as clamping the transition device 58 to the axle 20, etc. If the transition device 58 extends sufficiently far about the axle 20 (for example, if the axle has a circular cross-section and the transition device extends greater than 180° about the axle) then press-fitting and shrink-fitting may be used. The transition device 58 could have an inner radius which is initially less than an outer radius of the axle 20, so that the transition device may be snapped onto the axle, thereby compressing the transition device against the axle and removing any voids therebetween. After welding, tensile hoop strain may remain in the transition device 58 and compressive hoop strain may remain in the axle 20.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A vehicle suspension system, comprising:
   an axle constructed at least partially of a first metal alloy;
   an arm assembly including an axle attachment constructed at least partially of a second metal alloy which cannot be welded directly to the first metal alloy; and
   a transition device permanently secured to the first metal alloy and permanently secured to the second metal alloy, the transition device thereby interconnecting the axle to the axle attachment of the arm assembly, and
   wherein the transition device includes opposing first and second surfaces, the first surface being welded directly to the first metal alloy, and the second surface being welded directly to the second metal alloy.

2. The suspension system of claim 1, wherein the first metal alloy is a steel alloy.

3. The suspension system of claim 2, wherein the second metal alloy is an aluminum alloy.

4. The suspension system of claim 1, wherein the arm assembly includes an arm constructed entirely of the second metal alloy.

5. The suspension system of claim 4, wherein the arm has the axle attachment formed thereon.

6. The suspension system of claim 4, wherein the arm is integrally constructed of a single piece of material.

7. The suspension system of claim 1, wherein the transition device includes a first section constructed of an alloy which can be welded directly to the first metal alloy, and a second section constructed of another alloy which can be welded directly to the second metal alloy, the first and second sections being permanently secured to each other prior to securing the transition device to the axle and prior to securing the transition device to the axle attachment of the arm assembly.

8. The suspension system of claim 7, wherein the first section alloy and the first metal alloy are steel alloys, and wherein the second section alloy and the second metal alloy are aluminum alloys.

9. A vehicle suspension system, comprising:
 an axle constructed at least partially of a first metal alloy;
 an arm assembly including an axle attachment constructed at least partially of a second metal alloy which cannot be welded directly to the first metal alloy; and
 a transition device permanently secured to the first metal alloy and permanently secured to the second metal alloy, the transition device thereby interconnecting the axle to the axle attachment of the arm assembly, and
 wherein the transition device is welded to the axle.

10. The suspension system of claim 9, wherein the transition device is welded to the axle attachment.

11. The suspension system of claim 9, wherein the transition device is adhesively bonded to the axle attachment.

12. The suspension system of claim 9, wherein the transition device is compressed against the axle, thereby removing any voids between the transition device and the axle, prior to welding the transition device to the axle.

13. A vehicle suspension system, comprising:
 an axle constructed at least partially of a metal alloy;
 an arm assembly including an axle attachment constructed at least partially of a material which cannot be welded directly to the metal alloy; and
 a transition device permanently secured to the metal alloy and permanently secured to the axle attachment material, the transition device thereby interconnecting the axle to the axle attachment of the arm assembly, and
 wherein the transition device includes a first section constructed of an alloy which can be welded directly to the metal alloy, and a second section constructed of another alloy which can be welded directly to the axle attachment material, the first and second sections being permanently secured to each other prior to securing the transition device to the axle and prior to securing the transition device to the axle attachment of the arm assembly.

14. The suspension system of claim 13, wherein the transition device is welded to the axle.

15. The suspension system of claim 14, wherein the transition device is welded to the axle attachment.

16. The suspension system of claim 14, wherein the transition device is adhesively bonded to the axle attachment.

17. The suspension system of claim 14, wherein the transition device is compressed against the axle, thereby removing any voids between the transition device and the axle, prior to welding the transition device to the axle.

18. The suspension system of claim 13, wherein the transition device includes opposing first and second surfaces, the first surface being welded directly to the metal alloy, and the second surface being welded directly to the axle attachment material.

19. The suspension system of claim 13, wherein the metal alloy is a steel alloy.

20. The suspension system of claim 19, wherein the axle attachment material is an aluminum alloy.

21. The suspension system of claim 13, wherein the arm assembly includes an arm constructed entirely of the axle attachment material.

* * * * *